US011354852B2

(12) United States Patent
Evans et al.

(10) Patent No.: US 11,354,852 B2
(45) Date of Patent: Jun. 7, 2022

(54) REAL-TIME PROJECTION IN A MIXED REALITY ENVIRONMENT

(71) Applicant: Disney Enterprises, Inc., Burbank, CA (US)

(72) Inventors: Leslie M. Evans, La Crescenta, CA (US); Siroberto Scerbo, Montrose, CA (US); Clare M. Carroll, Pasadena, CA (US); Joseph G. Hager, IV, Valencia, CA (US); Nicholas S. Newberg, Los Angeles, CA (US); Alexis P. Wieland, Los Angeles, CA (US); Jonathan Becker, Carson, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 34 days.

(21) Appl. No.: 16/597,999

(22) Filed: Oct. 10, 2019

(65) Prior Publication Data
US 2021/0110598 A1 Apr. 15, 2021

(51) Int. Cl.
G06T 15/00 (2011.01)
G06T 19/00 (2011.01)
G06F 3/01 (2006.01)
G06T 15/50 (2011.01)

(52) U.S. Cl.
CPC .............. G06T 15/50 (2013.01); G06F 3/011 (2013.01); G06T 19/006 (2013.01)

(58) Field of Classification Search
CPC ............... G06F 2111/18; G06F 3/0481; G06F 3/04817; G06F 9/4443; G06F 3/04847; G06F 11/3664; G06F 3/012; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS 7,305,127 B2 * 12/2007 Wells ..................... G06K 9/346
345/421
8,405,680 B1 * 3/2013 Cardoso Lopes ....... G06T 19/00
345/633

(Continued)

OTHER PUBLICATIONS

Universal's Harry Potter Escape from Gringotts Rollercoaster; Jul. 8, 2014; https://www.youtube.com/watch?v=NRoZNIBMmVs (timestamp 7:40-13:20).*

(Continued)

*Primary Examiner* — Todd Buttram
(74) *Attorney, Agent, or Firm* — Dorsey & Whitney LLP (57) ABSTRACT

The present disclosure relates generally to systems and methods for creating a mixed reality environment. A mixed reality system includes a performance area for generating a mixed reality environment, a motion determination module that determines and tracks the motion of an object within the performance area, a physical article module that generates a physical article within the performance area, and a mixed reality display that displays a virtual article within the performance area, wherein the physical article and the virtual article are correlated to the motion of the object.

30 Claims, 4 Drawing Sheets

(56) References Cited

U.S. PATENT DOCUMENTS

| | | | |
|---|---|---|---|
| 2016/0048203 A1* | 2/2016 | Blum | G06F 3/012 |
| | | | 104/84 |
| 2017/0061691 A1* | 3/2017 | Scott | G06T 7/50 |
| 2018/0012411 A1* | 1/2018 | Richey | G06T 19/006 |
| 2018/0017791 A1* | 1/2018 | Beckman | G02B 27/0103 |
| 2019/0026946 A1* | 1/2019 | Jones | A63G 21/20 |
| 2019/0355073 A1* | 11/2019 | Lee | G06Q 50/10 |
| 2021/0065439 A1* | 3/2021 | Stafford | G02B 3/005 |

OTHER PUBLICATIONS

"Innovation and immersion: Escape from Gringotts"; fxguide; (https://www.fxguide.com/fxfeatured/innovation-and-Immersion-escape-from-gringotts/) (Year: 2015).*
https://www.itec.com/wp-content/uploads/2020/01/Spiderman.pdf; 1999.*
https://www.youtube.com/watch?v=Vr0Q2MWew8A; 2013.*
ITEC; 1999; https://www.itec.com/wp-content/uploads/2020/01/Spiderman.pdf; pp. 1-2.*

* cited by examiner

REAL-TIME PROJECTION IN A MIXED REALITY ENVIRONMENT

TECHNICAL FIELD

The technology described herein generally relates systems and methods to project light onto and around objects in real time in a mixed reality environment.

BACKGROUND

Traditional mixed reality, virtual reality, and augmented reality environments involve the merging of real and virtual components in a user environment such that virtual and physical objects may coexist and interact. Many mixed reality implementations do not include virtual object to physical object interactions (e.g., virtual light emitted from a virtual object does not wash adjacent physical objects with light), since such interactions are difficult to generate virtually in a realistic manner. In particular, such interactions may require high-resolution three-dimensional scans of the environment that are time and computing resource intensive, as well as modeling of surface reflections, refractions, and other light interactions that are difficult and computationally intensive to determine.

For example, with "see through" mixed reality systems, such as head worn displays that pass through light from the environment, these systems can generally perform "additive effects," such as adding effects or objects to a scene, but subtractive effects, such as creating shadows, are difficult to produce realistically and typically will not generate downstream or supplemental effects that would be expected in object-to-object interactions in the physical world. Similarly, traditional techniques may not adapt quickly to unpredictable movements of people or objects in a scene or may sacrifice quality for adaptability.

SUMMARY

In one embodiment, a mixed reality system is disclosed. The system includes an environmental model including data corresponding to a physical environment and a virtual environment, a physical article module that generates a physical article within the physical environment, and a mixed reality display that displays a virtual article within the virtual environment, where actuation of the physical article and actuation of the virtual article are correlated with one another based on the environment.

In another embodiment, a method of generating a mixed reality environment is disclosed. The method includes determining a position of a physical article within a performance area, determining a position of a virtual article within a virtual environment that overlays the performance area, rendering the virtual article within the virtual environment, rendering the physical article within the performance area, and rendering the virtual article within the virtual environment synchronized with the physical article in the performance area to generate a mixed reality experience for a user visualizing the virtual environment and the performance area.

In yet another embodiment, a method to generate a mixed reality experience is disclosed. The method includes detecting state information corresponding to a physical light source and a virtual object, based on the state information actuating a light source to project light on to a location within a physical environment, rendering a virtual object within a virtual environment, where the virtual object and the light source correspond to one another, and updating the location of the physical light source based on changes to the virtual object.

In addition to the exemplary aspects and embodiments described above, further aspects and embodiments will become apparent by reference to the drawings and by study of the following description.

DETAILED DESCRIPTION

The present disclosure includes systems and methods for creating mixed reality ("MR") environments where virtual articles, which may include both virtual objects and effects, interact with physical articles, e.g., physical objects and effects, to generate a combined user experience. The generation of virtual articles combined with a corresponding physical article enhances the authenticity or realism of the virtual article as experienced by a user. Virtual articles can include effects such as lighting, animation, objects, or displays that generate or augment a physical environment, e.g., animations of situations impractical or impossible to create in a physical environment. Physical articles can include lighting, wind, haptics, sounds, smells, objects, or other effects that people can detect with their senses and are generated physically or in reality, rather than digitally. The system combines or otherwise coordinates actuation of virtual articles and physical articles to increase the realism or otherwise improve the user experience in the virtual world. In other words, physical or real world generated articles are used in combination with virtually generated articles to enhance the virtual experience for the user.

To generate the combined articles, the system may include an environment including a physical article module (e.g., one or more physical light sources) and/or a motion determination module. Based on state changes of either a virtual article (e.g., animation changes) or changes to a physical article (e.g., change in position, movement, on/off or other activation state), the system varies at least one of the virtual article or the physical article. For example, the motion determination module can track the motion of objects or users in the MR environment and can generate virtual articles, such as virtual effects or lights, which can be displayed in an MR display, where the virtual objects move or otherwise change with the motion of the objects or users. As another example, as virtual object moves or changes brightness, the physical articles are actuated correspondingly to generate a combined effect for a user, where the overall effect will enhance the impact and realism of the virtual object.

In one example, the system generates a physical article in the form of a physical lighting effect on a physical object. As the physical lighting effect is being activated, the system generates a virtual article, such as a virtual lighting effect, that combines with the physical object and the physical light to create an MR effect. For example, a virtual effect of a beam of energy replicating a visual effect such as a light beam, that when viewed through an MR display (e.g., head mounted or handheld display), appears to emanate from an object, such a user's hands. As the virtual effect is activated, the system illuminates the object, e.g., user's hand with physical or real world generated light corresponding to light that would be generated by the virtual light beam, if the virtual light beam were physically generated. The user viewing the MR experience views a combined effect of the virtual light and the physical light interacting together. For example, the physical light can pass through the MR display or be combined by, the MR display, displaying the virtual light beam to create the composite effect. Because the physical light is generated in the real world, the reflection, refraction, color rendering, textures, highlights, and shadows caused by the light's interaction with the object are automatically and naturally generated, creating a realistic and rich user experience, without requiring the computationally intensive techniques to determine virtually the same interactions that would be caused by the light's interaction with the object. That is, by using physical effects to supplement the virtual effects, many of the computationally difficult techniques can be omitted, while still enhancing the overall user experience.

Figure 1:
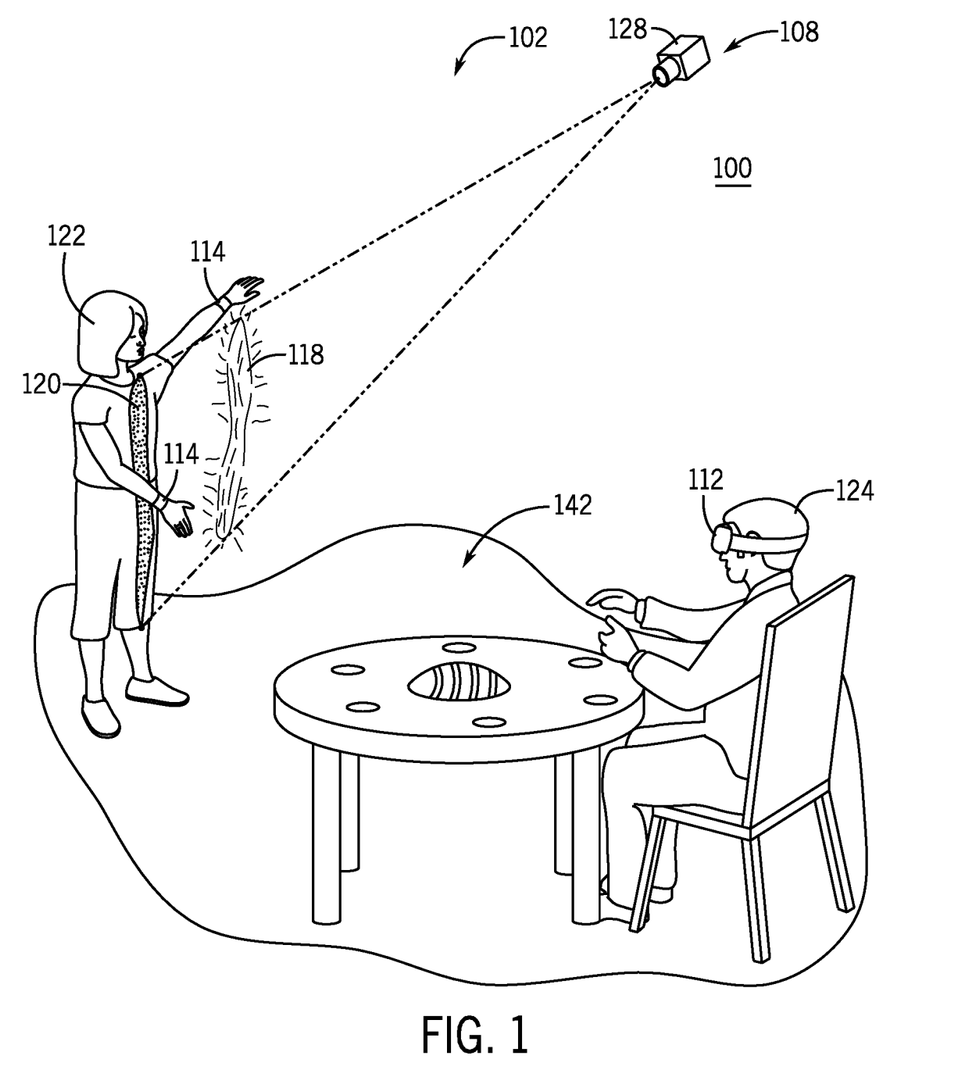
FIG. 1 illustrates a partial scene of an example of a mixed-reality environment.
Figure 2:
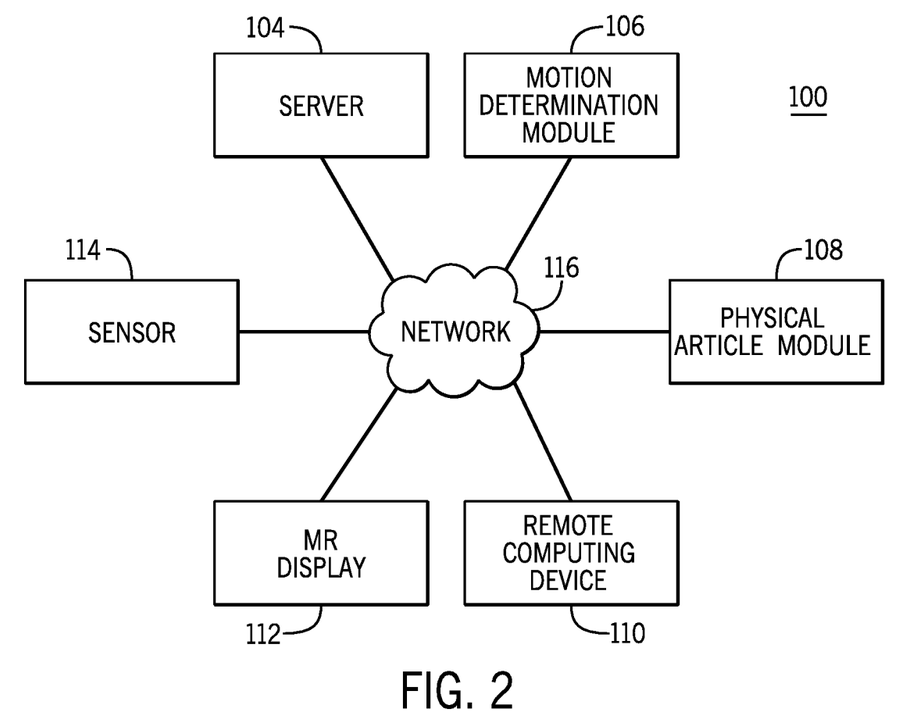
FIG. 2 is a simplified block diagram of an example of a mixed reality system.

FIG. 1 shows an example of an MR system 100 including an MR environment 102. FIG. 2 is a block diagram of components within the MR system 100 that can generate the MR articles. The system 100 can include a server 104, a motion determination module 106, a physical article module 108, a remote computing device 110, an MR display 112 and one or more sensors 114. The components of the system 100 can be connected by a network 116. The system 100 tracks motion of people and/or objects within the physical environment and coordinates physical articles (e.g., lighting effects) that are based on a position of the person or object within the physical space and within the virtual space.

The MR display 112 displays image data to a user 124 or two or more users, the image data includes both virtual articles 118, such as virtually generated effects and animation, as well as physical articles 120, such as physical world effects and objects. The MR display 112 may be, for example, a liquid crystal display, light emitting diode, cathode ray tube, plasma screen or the like. The MR display 112 may be a head mounted device, a handheld or other display, and/or another display viewable by the user. The MR display 112 may utilize a camera or other sensor that measures light in the physical world and integrates that light digitally (e.g., by creating a representation or image of that light on a screen) with virtual articles as an overlay or composite image to display the physical articles 120 and/or may be configured to allow light from the MR environment 102 to pass through to reach the user's 124 eyes, such as through a partially transparent screen, like a partially silvered mirror or screen, a window, light pipe, or the like. In this manner, the MR display 112 includes the virtual environment and objects that are either overlaid or composited with an image, light from, or other representation of the physical environment. Additionally or alternately, the MR display can include a camera or other The environment 102 is any type of physical space that includes one or more modules, actuators, lights, sound generators, haptic effect generators and the like that can generate MR effects within a performance area 142. The environment 102 may be, for example, an auditorium, theater, amusement park, or other space where one or more users can access. In some instances, the environment may include a performance area 142 where physical objects and/or people are positioned and configured to interact with the virtual environment. For example, as shown in FIG. 2, two people or actors 122, 124 are positioned within the performance area 142. More or fewer people may be present in the performance area 102 in other examples. In this example, the person 122 is a performer and the person 124 is a user or guest, however in many instances the two roles may be combined.

The motion determination module 106 determines and tracks the position and movement of physical articles 120 and/or people within the environment 102. For example, the position of an actor, such as the performer 122, can be determined via a motion capture system that tracks the movements of the actor's arms, head, feet or other body parts. The motion determination module 106 can also determine the position of a user, such as the user 124 watching or interacting with the scene, e.g., those users visualizing aspects through a display or the like. In some examples, the motion determination module 106 includes a system of cameras that track movements of objects or people, such as through image recognition techniques or the like.

Additionally or alternatively, the motion determination module 106 can include markers or trackers placed on the objects or worn by people, the markers may be optical or non-optical. In examples utilizing optical markers, cameras or other sensors capture positions, velocity and accelerations of the markers as the objects or people move in the environment 102. In examples, with non-optical markers, the markers can output other signals that are detectable and/or directly measure changes in inertia or mechanical motion that are used to estimate positions of objects or people within the environment. In other examples, sensors such as cameras, time of flight sensors (e.g., SONAR, RADAR, LIDAR or the like) are included in the motion detection module 106 to detect depth of people or objects relative to known or fixed positions. In other examples, targets or sensors can detect muscle activity, such as the contraction or lengthening of a muscle of a finger, leg, arm, or other limb, or of facial muscles, thereby detecting movement and/or facial expressions.

The physical article module 108 acts to selectively illuminate areas or objects within the environment and includes one or more light sources such as projectors, mobile lights, beam lights, accent lights, backlights, parabolic aluminized reflector lights, Fresnel lanterns, ellipsoidal reflector lights, strip lights, scoop lights, spotlights, moving lights, lasers or other collimated light sources, polarized lights, and/or stationary lights. In other examples, the light source can be a lamp such as an incandescent lamp, LED lamp, florescent lamp, a laser, or the like. The physical article module 108 can include a mosaic or array of projectors, arranged about the environment as desired. A projector 128 can be any suitable projector such as a digital light processor, an LCD projector, a laser projector. The physical effect module 108 can include a hologram, or can display a physical effect such as Pepper's ghost, or the like.

In some instances, the physical locations of components of the physical article module 108, e.g., light sources, is detectable, or otherwise determined. For example, the positioning of light sources is tracked or mapped in a virtual model of the environment 102. Such locations can be static, dynamic, or static at some times and dynamic at other times. In other words, the components of the physical article module 108 may be moved around as needed to accommodate desired effects or the like. The physical article module 108 can also include devices or system to generate wind, haptics, sounds, smells, objects, robots, set-work, props, a person, or other effects that people can detect with their senses.

One or more sensors 114 are used to sense a parameters of the environment or the people and objects within the environment 102, e.g., to provide state information regarding the physical environment. The detected parameters are used to update physical actuation of articles and/or virtual actuation of articles. For example, the sensors 114 may measure environmental factors such as light level, temperature, wind speed, noise or sound level, humidity, carbon dioxide or other components of the atmosphere. The sensors 114 can measure the proximity of people or objects to other people or objects, position of objects or people within the environment 102, for example by determining coordinates of people or objects within a three-dimensional space. Sensors 114 may also determine an action by a person such as a performer 122 or user 124, such as turning on a switch, or dial, sitting, standing, clapping their hands, speaking, or moving their bodies or interacting with physical 120 or virtual 118 articles.

The server 104 or computing element controls various aspects and components of the system 100, e.g., the server 104 can coordinate operation of modules to generate various physical 120 and/or virtual 118 articles. The server 104 can include a processing element such as a central processing unit (CPU) or a graphics processing unit (GPU) that executes machine readable instructions to generate physical 120 or virtual 118 articles, coordinate communication between, and control, the modules and components of the system 100. The processing elements can be in a single device such as a server, desktop computer, laptop, and/or personal user device like a phone. The processing elements can also be distributed across more than one device, such as servers connected in a server system, or servers connected via a network such as the internet, a cell phone network, virtual private network or other network.

The network 116 defines one or more communication mechanisms for the modules and components of the system 100 to allow them to communication with another and/or with devices outside the system 100 through a network 116. The network 116 may be a cellular, satellite, or other wireless network (WiFi, WiMAX, Bluetooth, NFC) or a wired network (Ethernet), or a combination thereof.

With reference to FIG. 1, as an example of an MR experience utilizing the, system 100, the user 124 is wearing a head-mounted MR display 112. The MR display 112 can display both physical articles (e.g., people, objects, lights, and shadows) and virtual articles (e.g., virtual objects and effects). The physical effect module 108 of the MR environment includes a projector 128 configured to project light onto a performer 122 corresponding to the virtual environment. In particular, as the performer 122 moves her hands, the sensors 114 providing information to the motion determination module 106, allowing the module 106 to track the location, position, and/or movement of her wrists. The sensors 114 may be disguised or hidden such that they are not readily visible to the user 124. As the performer 122 moves her wrists, the motion and position of her wrists are tracked by the motion determination module 106, which relays the information to the server 104, for instance via the network 116. Based on the positioning of the performer, the server 104 then causes the MR display 112 to display a virtual article 118, which in a specific example, is a light or emanating from the performer's 122 hands, with the light being virtually aligned with the position of the performer's hands as viewed through the MR display 112.

In coordination with the display of the virtual article 118, the server 104 causes the physical article module 108, including the projector 128 to display a physical article 120 onto the performer 122. In this example, the physical article 120 appears as light cast from the virtual article 118, the light beam. For example, the projector 128 will project light onto the hands of the performer 122, using the motion tracking to determine the projection location and selecting the hue, brightness, and other projection characteristics to match those in the virtual article 118. The physical article 120 and the virtual article 118 are presented to the user via the MR display 112 at substantially the same time, since the actuation of both the animation and the real life projection are synced or otherwise coordinated, such as being tracked through a combined model modeling both the virtual and physical environments. Additionally, the locations of the physical article 120 and the virtual article 118 are positioned such that the physical article 120 appears as a consequence of the virtual article 118, e.g., the physical article 120 is presented as light cast from the virtual article 118. In other examples, the physical article 120 can be presented as a consequence of the virtual article 118. In various examples, the physical article 120 and the virtual article 118 can interact with, and react to, one another.

As the performer 122 moves her arms, the system 100 tracks the movement and position of the sensors 114 worn on her wrists (or other location), and moves both the virtual light beam 118 and the physical light 120 accordingly. As the user 124 views the virtual light beam 118, and the physical light 120 together through the MR display 112 the virtual light beam 118 appears to be casting real light, from the physical light 120, on the performer 122. The realistic lighting reflection, shadows, and the like generated by the physical actuation of the light enhance the experience and can be difficult, if not impossible, to render in a solely virtual environment, especially at real-time.

One or more users 124 can watch the scene on an MR display 112. For example, the virtual animation or articles 118 may be transmitted and display on multiple user displays simultaneously. Alternatively, a single MR display 112 may be viewable by multiple users.

Virtual 118 and physical 120 articles can be combined in an object, such as an object including a remote computing device 110. A remote computing device 110 can be configured to generate a physical article 120 within the MR environment 102, for example by illuminating a light, generating a sound, emitting a smell, or the like. A remote computing device can also help generate a virtual article 118. For instance the remote computing device 110 can be tracked by the motion determination module 106 such that the system 100 generates a virtual article 118 associated with the location of the remote computing device 110. A virtual article 118 and physical article 120 associated with the remote computing device 110 can interact with one another. In various examples, a remote computing device 110 can be a microcontroller such as an Arduino, or Raspberry Pi or a device like a smart phone or tablet, or other suitable device.

Figure 3:
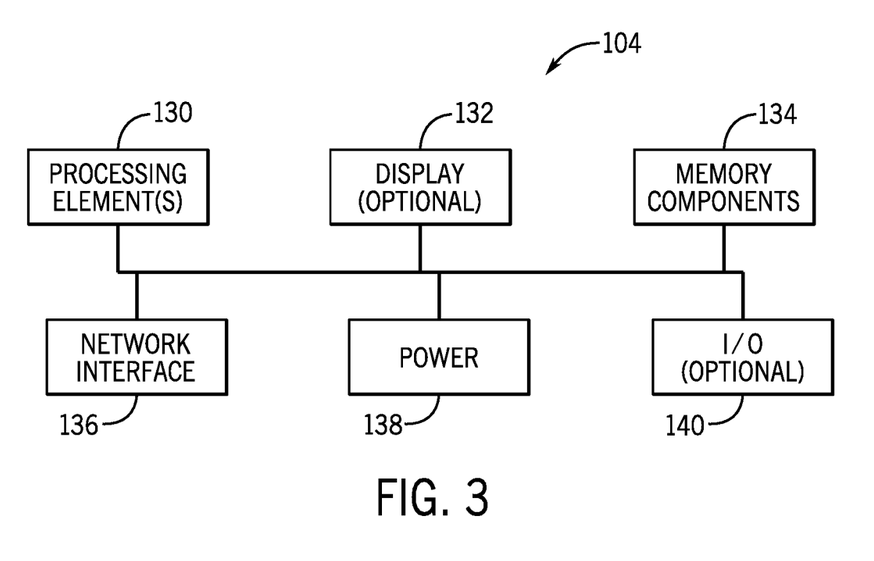
FIG. 3 is a simplified block diagram of a server for use in the mixed reality system of FIG. 2.

FIG. 3 illustrates a simplified block diagram for the various devices of the system 100 including the server 104, the motion determination module 106, the MR display 112, and the remote computing device 110. As shown, the various devices may include one or more processing elements 130, an optional display 132, one or more memory components 134, a network interface 136, optional power 138, and an optional input/output (I/O) interface 140, where the various components may be in direct or indirect communication with one another, such as via one or more system buses, contract traces, wiring, or via wireless mechanisms.

The one or more processing elements 130 may be substantially any electronic device capable of processing, receiving, and/or transmitting instructions. For example, the processing elements 130 may be a microprocessor, microcomputer, graphics processing unit, or the like. It also should be noted that the processing elements 130 may include one or more processing elements or modules that may or may not be in communication with one another. For example, a first processing element may control a first set of components of the computing device and a second processing element may control a second set of components of the computing device where the first and second processing elements may or may not be in communication with each other. Relatedly, the processing elements may be configured to execute one or more instructions in parallel locally, and/or across the network, such as through cloud computing resources.

The display 132 is optional and provides an input/output mechanism for devices of the system 100, such as to display visual information (e.g., images, graphical user interfaces, videos, notifications, and the like) to a user, and in certain instances may also act to receive user input (e.g., via a touch screen or the like). The display may be an LCD screen, plasma screen, LED screen, an organic LED screen, or the like. The type and number of displays may vary with the type of devices (e.g., smartphone versus a desktop computer).

The memory components 134 store electronic data that may be utilized by the computing devices, such as audio files, video files, document files, programming instructions, models of the physical locations of objects in the MR environment 102, and the like. The memory components 134 may be, for example, non-volatile storage, a magnetic storage medium, optical storage medium, magneto-optical storage medium, read only memory, random access memory, erasable programmable memory, flash memory, or a combination of one or more types of memory components. In many embodiments, the servers 104 may have a larger memory capacity than the remote computing device 110, with the memory components optionally linked via a cloud network 116 or the like.

The network interface 136 receives and transmits data to and from the network 116 to the various devices of the system 100. The network/communication interface 136 may transmit and send data to the network 116 directly or indirectly. For example, the networking/communication interface may transmit data to and from other computing devices through the network 116. In some embodiments, the network interface may also include various modules, such as an application program interface (API) that interfaces and translates requests across the network 116 to the specific server 104 or remote computing device 110.

The various devices of the system may also include a power supply 138. The power supply 138 provides power to various components of the computing devices 110 or server 104. The power supply 138 may include one or more rechargeable, disposable, or hardwire sources, e.g., batteries, power cord, AC/DC inverter, DC/DC converter, or the like. Additionally, the power supply 138 may include one or more types of connectors or components that provide different types of power to the remote computing device 110 and/or server 104. In some embodiments, the power supply 138 may include a connector (such as a universal serial bus) that provides power to the computer or batteries within the computer and also transmits data to and from the device to other devices.

The input/output interface 140 allows the system devices to receive input from a user and provide output to a user. In some devices, for instance the remote computing device 110, the I/O interface may be optional. For example, the input/output interface 140 may include a capacitive touch screen, keyboard, mouse, stylus, or the like. The type of devices that interact via the input/output interface 140 may be varied as desired.

Figure 4:
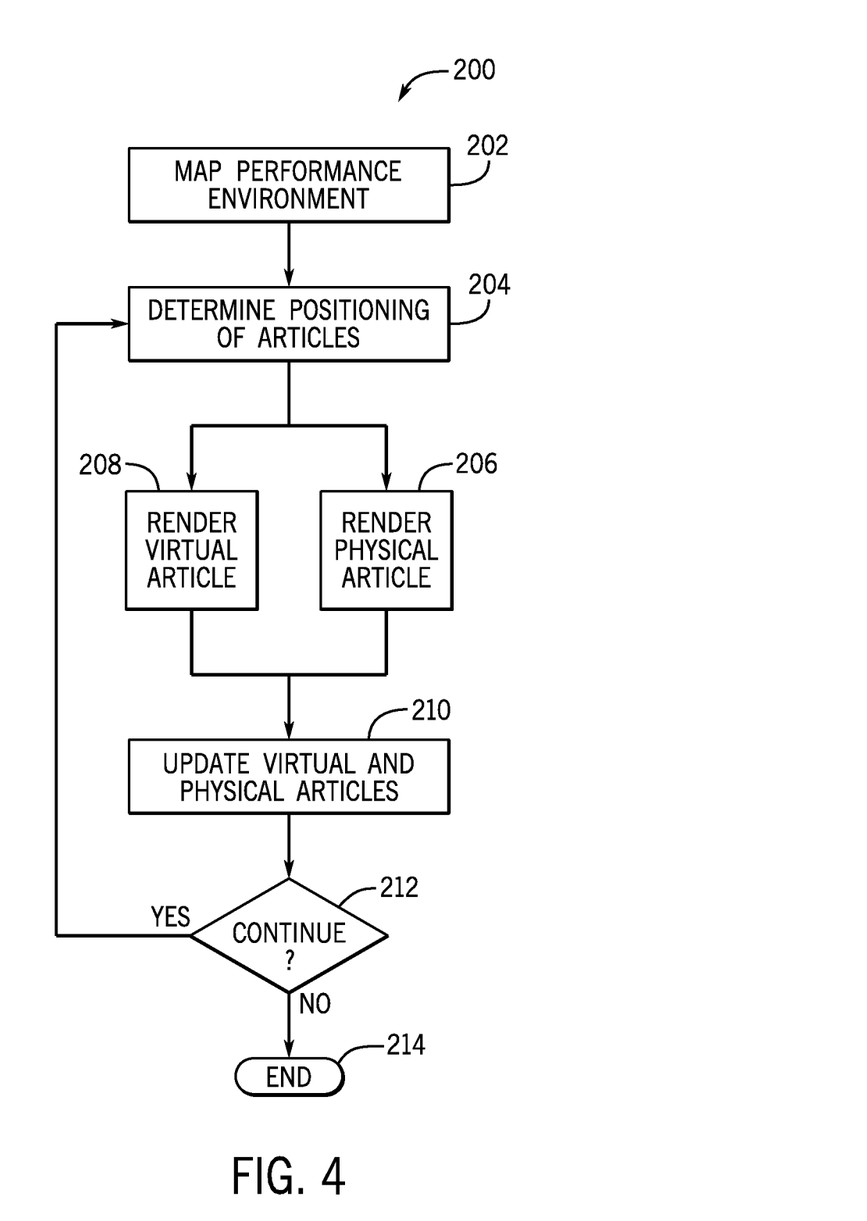
FIG. 4 is a flow chart illustrating an example of a method of creating a mixed reality environment with the system of FIG. 2.
Figure 5:
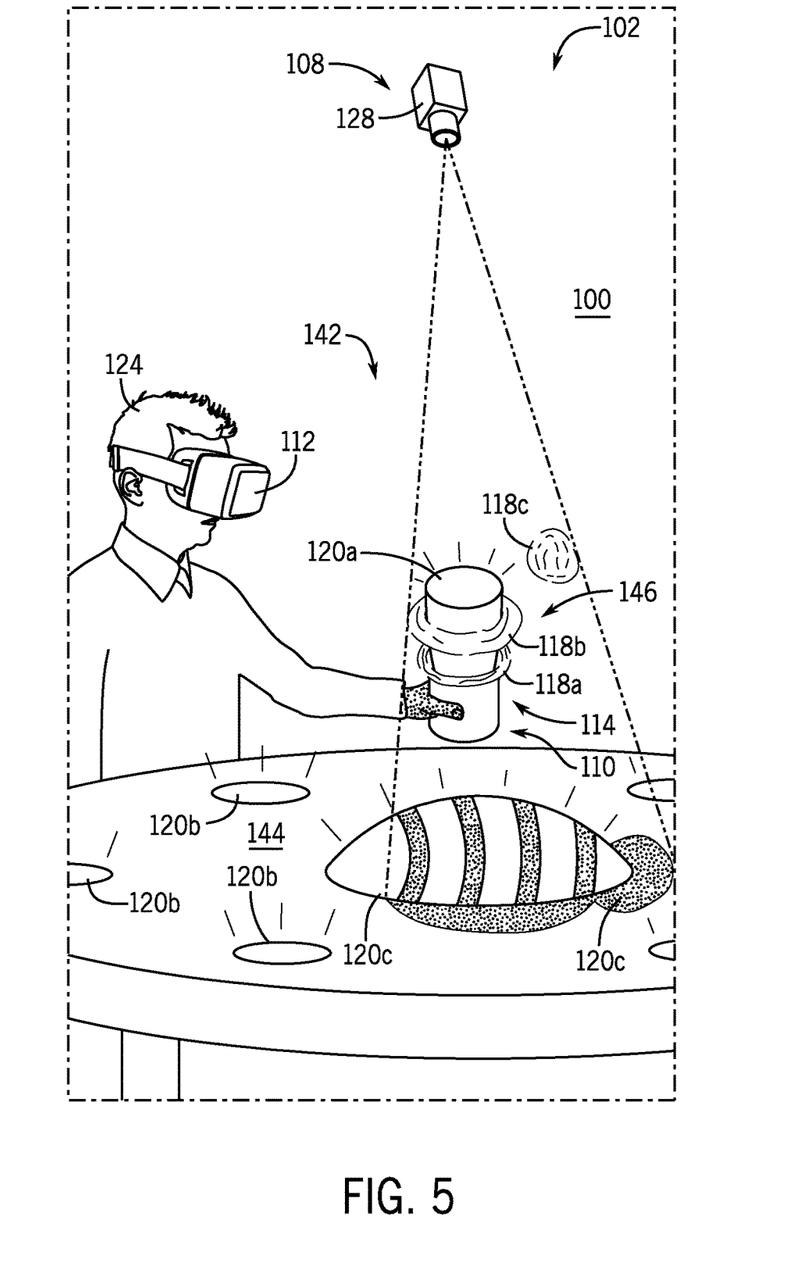
FIG. 5 illustrates a partial scene of another example of a mixed-reality environment.

FIG. 4 illustrates a method 200 of creating an MR environment 102 according to the system 100, shown for example in FIGS. 1 and 5. The operations of the method 400 can be executed in an alternative order from that presented without deviating from the present disclosure.

The method 200 may begin in operation 202 and a processing element 130 on the server 104 maps the environment 101. The mapping operation 202 includes determining the locations and orientations of the physical boundaries of the environment 102 and the components, systems, and modules that generate the physical and virtual articles (e.g., the components in the physical article module 108, the motion determination module 106, and the like). The mapping can include determining the locations and orientations of the boundaries of the performance area 142 such as walls, floors, ceilings; railings for other fixtures or furniture. The mapping may also include determining the locations and orientations of elements of the physical article module 108, such as physical lights, haptic elements, speakers or other physical elements; elements of the motion determination module 106 such as cameras or receivers; remote computing devices 110; MR displays 112; sensors 114; or people 122, 124. The mapping can take place before the rendering of an MR environment 102. The mapping can also be done throughout the rendering of an MR environment. Also, certain articles can be mapped before the rendering of an MR environment (e.g., the location of a projector or physical light 128), while others can be mapped continuously or periodically during the rendering of an MR environment 102.

In one example, the mapping operation 202 can include performing a 3D scan of the environment 102 including the performance area 142 to locate various components in the environment 102. In another example, the mapping operation can include developing a 3D model of the environment 102 by measuring with any suitable means (e.g., a tape measure, ruler, level, transit, theodolite, global positioning system, or the like) the positions and/or orientations of the various components of in the environment 102. In another example, the environment can be designed in a 3D computer automated design software (e.g., Solidworks, AutoCAD, or the like) and built according to the design, thus locating the positions and orientations of the components in the environment 102.

The mapping is used to generate a model that corresponds to the physical environment and is used to track and actuate virtual and physical articles in coordination with one another. The environment model includes information corresponding to both the physical environment and the corresponding virtual environment. Objects and articles within both environments can then be tracked and coordinated within the combined environment to generate corresponding effects For example, the server 104 can use the mapping as well as sensors and/or monitors to capture detailed state information about the mixed reality environment 102. In particular, the state of physical articles 120 like physical light sources and virtual articles 118 like virtual light sources effects or animations can be monitored by the server 104 and used to generate or update the environment model. The server 104 updates the actuation of physical article 120 or virtual article 1180 based on state changes.

The method 200 may proceed to operation 204 and the processing element 130 of the server 104 or the motion determination module 106 determines the state information of physical 120 and/or virtual 118 articles within the MR environment 102. For example, in operation 204, the motion determination module 106 determines the location of a person such as the performer 122, such as tracking certain body parts of the performer 122. The motion determination module 106 can track the position of sensors 114 or remote computing devices 110 as worn by the user to determine user motion. In other examples, the network 116 or the server 104 tracks the position of a remote computing device 110 without the motion determination module 106, such as by Wi-Fi triangulation, GPS, or other methods. The system can track the position of MR displays 112 using the same or similar methods. For virtual objects, the system 100 may determine a new location of change in characteristics for the virtual article. The state information may encompass changes in position, orientation, brightness, hue, object type (e.g., low beam to high beam), material, or the like.

In some instances, operation 204 may be differentiated from operation 202 in that operation 202 determines the position, motion, orientation, etc. of the devices that create or display mixed reality articles (e.g., a projector), whereas operation 204 determines where those articles are presented (e.g., the projector displays a lightning bolt on an actor). That said, while operations 202 and 204 are shown as sequential operations in FIG. 4, it is understood that all, or portions, of the operations can be performed simultaneously, or that operation 204 can be performed before operation 202, and/or that one of the operations may be omitted.

Based on the determined state information for the physical article 120 and/or virtual article 118, as well as the model environment, the method 200 may proceed substantially simultaneously to operations 206 and 208 and the system 100 renders or generates physical articles 120 and virtual articles 118, respectively. In other words, operations 206 and 208 may be executed in parallel. The actuation and selection of particular physical and virtual articles depends on various inputs, frames, timing, or the like, with respect to either the virtual or physical environment. For example, if a new frame in the virtual environment is selected to be rendered at the next moment in time, the corresponding physical article corresponding to the new frame (e.g., light effects based on objects newly presented in the new frame) is selected to be rendered next well. The virtual and physical articles may be codependent and varied correspondingly and/or one may be dependent on the other, i.e., the virtual effects will drive the physical effects or vice versa. The coordination and actuation can be based on predicative assessments of either the virtual or physical environments, choreographed or staged articles, or a combination of predictive and choreographed content. In some instances, the environment may also accommodate real time tracking and updating of physical/virtual articles based on un-programmed or planned content. As an example, using the model, light interactions between physical 120 and virtual 118 articles can be extrapolated, e.g., as a virtual article is actuated, the physical articles are actuated based on an estimated impact of the virtual article in the physical environment.

In operations 206 and 208, the locations and other state information (e.g., on, off, brightness, hue, etc.) of the articles as determined in operation 204 can be used to simultaneously render the virtual 118 and physical articles 120 in corresponding or cooperating locations as viewed by a user 124 via an MR display 112. For example, as shown in FIG. 1, a light beam (an example of a virtual article 118) can be displayed in an MR display 112 can appear to emanate from an actor's 122 hands, meanwhile, a physical light beam (an example of a physical article 120) is simultaneously projected onto the actor 122 to simulate light that would be cast by the light beam. In this example, the two articles, the light beam and the physical light beam are combined in a composite image by the MR display and displayed to the user 124.

In another example, a virtual light source can be analyzed to determine how it would interact with physical objects if it were instead a physical light source. Conversely, a physical light source can be analyzed to determine how it would interact with virtual objects if the virtual objects were instead physical. The processing element 130 of the server 104 can control physical lighting in the environment 102 such as by activating physical lighting to simulate the interaction effects on physical objects. For example, an off-set spot light or projector can illuminate a halo around a candle when the candle is virtually lit. This illumination can be projection mapped onto an irregular projection surface to make the simulated effect more realistic. The server 104 can also modify the appearance of virtual objects to account for physical lighting changes. For example, when a physical candle is lit, nearby virtual objects can be lit with a simulated candle glow and appropriate shadows.

In operation 206, the processing element 130 renders physical articles 120 by actuating the physical article module 108. Examples of physical articles 120 can include projection of images or light from a projector 128 or from a fixed light source 128 such as a stage light. Other lights can be activated within objects within the performance area 142, such as lights embedded in furniture or in objects associated with a remote computing device 110. Lasers can be used to generate physical articles on some examples. The wavelengths of light generated may be visible to the human eye, or they may be outside the range of human visual perception, such as ultra-violet or infrared. Such lights can be used with surfaces on physical objects within the performance area that react or fluoresce with exposure to ultraviolet light. Other lights such a polarized light or blue lights can be used. Other physical articles 120 can include the release of scents, the spraying of liquids, fog, wind, noises, sound, or the launching of projectiles.

In operation 208 the system 100 renders virtual articles 118 via an MR display 112. In various examples, the rendering can include displaying a virtual animation, such as of an animated character or object, or playing video of images captured in the physical world, such as an actor playing a role of a character. Virtual articles 118 can be virtual lights, animations, objects, or other effects that generally would not occur in the physical world. Some examples include: light or energy beams, fluids that appear to defy gravity, animated characters (either fictitious or based on real people), animals, or even simulations like flying, running, swimming, or space travel. In certain examples virtual articles can distort the scale of the real world such as a simulation that depicts a user shrinking to a microscopic size, or growing to a size larger than a real person.

In either or both of operations 206 or 208, the rendering of physical 120 and virtual articles 118 can be actuated, correlated, or synchronized by a trigger. In some examples, a trigger can be predetermined, such as by a script, timing, or choreography. A trigger can be initiated by a cue, such as the playing of a song, lighting of a light, an action by a person such as a user 124 or performer 122, or the expiration of a timer. In some examples a trigger can be based on an input from a sensor, such as an accelerometer, gyroscope, proximity detector, camera, microphone, weight sensor, light sensor, breaking of a light beam, eye gaze tracker, a positional tracker associated with an object or person, a touch screen, control panel, switch, dial, lever, or the like. A trigger can be activated automatically, or manually by such by a person. For instance, a user 124 can turn a dial in the physical world to result in a virtual change such as the hue, color, brightness, shape, position or other characteristic of either a virtual article. A trigger can be initiated by a person in the performance area 142, such as a performer 122 or a user 124, or it can be initiated by a person outside a performance area 142, such as a director or technician outside the performance area 142.

A trigger can take place in the virtual environment, a virtual trigger, or the physical environment, a physical trigger. For instance, in the physical environment, a physical trigger may activate when an object is in a certain position, or a user 124 picks up an object, crosses a threshold, or looks at or manipulates a physical article. A virtual trigger can activate when a virtual article 118 such as an animation reaches a certain point, such as a virtual effect beginning or ending, or a user interacts or looks at a virtual article 118. Virtual and physical triggers can interact with one another. A physical trigger can initiate or synchronize the rendering, or affect an attribute of a physical article and/or a virtual article. Likewise, a virtual trigger can initiate or synchronize the rendering, or affect an attribute of a physical article and/or a virtual article. For example, an MR display 112 can detect light from a physical article 120 and can trigger the rendering of a virtual article 118, like an animation, in the MR display 112. The rendering of the virtual article 118 can initiate a virtual trigger to initiate or synchronize a physical article 120. Returning to the example of FIG. 1, a performer 122 can initiate a physical trigger by clapping or moving her hands together, which can be detected by the motion determination module 106 via the sensors 114 to trigger the rendering of a light beam (an example of a virtual article 118) in the MR display worn by the user 124. The rendering of the light beam in the MR display can initiate a virtual trigger that causes the physical article module 108 to render a light (an example of a physical article 120) cast from the projector 128 onto the performer 122.

The method may proceed to operation 210 and the processing element 130 of the server 104 updates a virtual article 118 and/or a physical article 120. The operation 210 may update any characteristic or attribute of the virtual article 118 and/or physical article 120, such as color, position, size, orientation, hue, brightness, volume or the like. The updating may be based on the initiation or expiration of a trigger. For example, a physical article 120 or a virtual article 118 can be updated based on a position, characteristic, or attribute of another physical article 120 or the virtual article 118. Continuing the example of FIG. 1, the performer 122 could activate a sensor, such a hidden switch in the floor, to initiate yet another physical trigger that could change the color, shape or brightness of one or both of the light beam displayed in the MR display or the light cast from the projector 128. For instance, the light beam could change in color from yellow to blue in the MR display, and the projector 128 could correspondingly display a blue light.

The method may proceed to operation 212 and the processing element 130 of the server 104 determines whether the MR environment created by the system 100 should continue. If the MR environment is to continue, the method may return to operation 204 and the system can update the positions of the articles. If the MR environment is not to continue, the method ends in operation 214.

FIG. 5 illustrates another example of an MR environment 102 created by the system 100. The MR environment includes a performance area 142. In this example, the performance area 142 is substantially above the top of a table 144. In this example, a user 124 is shown wearing an MR display 112. The user 124 holds a physical article 120, which in this example is a physical chalice 146. The chalice 146 has embedded within it a sensor 114 and a remote computing device 110 (not shown). The sensor 114 and the remote computing device 110 allow the system 100 to track the location of the chalice 120 within the performance area. As the user 124 moves the chalice 120, a number of virtual articles 118 are generated in relation to the chalice 146. For example virtual rings of light 118a, 118b appear to emanate from the chalice 146. Another virtual article, 118c, in this case fluid that appears to defy the laws of gravity, is associated with the chalice 146. Additionally, LED lights embedded in the chalice 146 and in communication with the remote computing device 110 cause physical light 120a to emanate from the chalice 146. A sensor, such as a dial, in communication with the remote computing device 110, can be associated with the chalice 146 to allow a user to control or select a type, color, or other property of the virtual article 118c. For example, the user 124 can rotate a dial and change the color or the gravitational properties of the anti-gravitational fluid.

The system 100 via the physical article module 108, including a projector 128, displays a number of physical lighting effects 120 on the table 144. The physical lighting effects 120 can include additive effects such as areas 120b lighted by light emissions. The physical lighting effects can include subtractive effects that remove or block light, detail, or objects from the environment, such as areas of shadow 120c. In this example, an area of shadow 120c is a physical article that corresponds to a shadow that could be cast by the virtual article 118c, the anti-gravitational fluid. The system, according to method 200 coordinates the rendering and positioning of these various physical 120 and virtual 118 articles as the user moves the chalice 146 in the performance area 142.

The foregoing description, for purposes of explanation, uses specific nomenclature to provide a thorough understanding of the described embodiments. However, it will be apparent to one skilled in the art that the specific details are not required to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A mixed reality system comprising:
   an environment model hosted on a computing device, including data corresponding to a physical environment and a virtual environment, wherein the environmental model replicates a mixed reality environment;
   a physical article module that generates a physical article within the physical environment; and a user wearable mixed reality display in electronic communication with the computing device that receives image data from the computing device and displays a virtual article within the virtual environment based on the image data, wherein:
an actuation of the physical article and an actuation of the virtual article are correlated with one another based on the environment model,
light from the physical article passes through the mixed reality display toward a user such that the physical environment and the virtual environment are combined and the physical article and the virtual article are viewable together as a composite effect through the mixed reality display, and
the environmental model tracks a dynamic position of the physical article such that the physical article is configured to enhance an authenticity of the virtual article when viewed together as the composite effect through the mixed reality display.

2. The mixed reality system of claim 1, further comprising a motion determination module that determines and tracks a position of an object within the physical environment, and at least one of the actuation of the physical article or the actuation of the virtual article is correlated to the position of the object.

3. The mixed reality system of claim 1, wherein information related to the physical article is presented together with the virtual article in the virtual environment.

4. The mixed reality system of claim 1, wherein the physical article and the virtual article are presented such that the physical article is presented as a consequence of the virtual article.

5. The mixed reality system of claim 1, wherein an attribute of one of the physical article or the virtual article is updated based on an attribute of the other of the physical article or the virtual article.

6. The mixed reality system of claim 2, wherein a motion of the virtual article is correlated with a motion of the object.

7. The mixed reality system of claim 1, wherein an attribute of the physical article or an attribute of the virtual article is correlated with a trigger that affects another attribute of the other of the physical article or the virtual article.

8. The mixed reality system of claim 7, wherein the trigger is predetermined.

9. The mixed reality system of claim 8, wherein the trigger comprises timing.

10. The mixed reality system of claim 2, wherein the object is associated with a person such that the virtual article is varied based on changes in a position of the person.

11. The mixed reality system of claim 10, where the position of the virtual article is updated based on the updated position of the person.

12. The mixed reality system of claim 1, wherein one of the virtual article or the physical article affects the display of the other of the virtual article or the physical article.

13. The mixed reality system of claim 2, wherein the object includes a remote computing device that enables the motion determination module to track a position of the remote computing device, and rendering of the virtual article is correlated to the position of the remote computing device.

14. The mixed reality system of claim 13, wherein the remote computing device displays the physical article in response to the actuation of the virtual article, and a position of the physical article and a position of the virtual article are correlated with one another.

15. The mixed reality system of claim 14, wherein the remote computing device is in communication with a sensor, the sensor operable by a person to allow the person to select an attribute of the virtual article.

16. The mixed reality system of claim 1, wherein the physical article is a subtractive effect that removes one of light, detail, or an object from the physical environment.

17. The mixed reality system of claim 16, wherein the subtractive effect is a shadow.

18. The mixed reality system of claim 1, wherein the physical article is a lighting effect, and as the virtual article is activated, the lighting effect illuminates a physical object with real world light corresponding to light that would be generated by the virtual article as if the virtual article were physically generated.

19. The mixed reality system of claim 1, wherein the environment model tracks a dynamic state change of the physical article and a dynamic state change of the virtual article and updates the actuation of the physical article and the virtual article based on the dynamic state changes.

20. The mixed reality system of claim 1, wherein the physical article and the virtual article are presented such that the virtual article enhances a characteristic of the physical article.

21. The mixed reality system of claim 1, wherein an attribute of the physical article or an attribute of the virtual article is correlated with one of choreography or a script that affects another attribute of the other of the physical article or the virtual article.

22. The mixed reality system of claim 1, wherein the virtual article is free to move within the virtual environment.

23. A method of generating a mixed reality environment comprising:
tracking, based on an environment model that replicates a mixed reality environment hosted on a computing device, a dynamic position of a physical article within a performance area;
determining a position of a virtual article within a virtual environment, based on the environment model, that overlays the performance area;
rendering the virtual article via a user wearable mixed reality display that receives image data from the computing device and displays the virtual article within the virtual environment;
rendering the physical article within the performance area to enhance an authenticity of the virtual article; and
rendering the virtual article with a mixed reality display within the virtual environment synchronized with the physical article in the performance area to generate a mixed reality experience for a user visualizing the virtual environment and the performance area with the mixed reality display, wherein light from the physical article passes through the mixed reality display toward a user such that the physical environment and virtual environment are combined and the physical article and the virtual article are viewable together as a composite effect through the mixed reality display.

24. The method of claim 23, further comprising mapping a performance area associated with the mixed reality environment.

25. The method of claim 23, further comprising updating an attribute of the virtual article or an attribute of the physical article, wherein the physical article is a lighting effect, and as the virtual article is activated, the lighting effect illuminates a physical object with real world light corresponding to light that would be generated by the virtual article as if the virtual article were physically generated.

26. The method of claim 23, wherein the position of the physical article is correlated to the position of the virtual article.

27. The method of claim 23, wherein the physical article and the virtual article appear in a mixed reality display to be combined in the performance area.

28. A method to generate a mixed reality experience comprising:
- detecting state information from an environmental model corresponding to a physical light source and a virtual object, wherein the environmental model tracks a position of the physical light source;
- based on the state information, actuating the physical light source to project light on to a location within a physical environment, such that the light source enhances an authenticity of the virtual object;
- rendering the virtual object within a virtual environment presented by a user wearable mixed reality display, wherein light from the physical light source passes through the mixed reality display toward a user such that the virtual object and the physical light source are viewable together as a composite effect through the mixed reality display; and
- updating the location of the physical light source based on a free movement of the virtual object within the virtual environment.

29. The method of claim 28, wherein the light source is selected to be representative of a light emission or light blocking generated by the virtual object as if the virtual object was positioned within the physical environment.

30. The method of claim 28, further comprising generating a model of a combined environment, the combined environment including characteristics of the virtual environment and the physical environment.

* * * * *